No. 829,824. PATENTED AUG. 28, 1906.
R. ZICHA.
MINER'S LAMP.
APPLICATION FILED APR. 2, 1906.
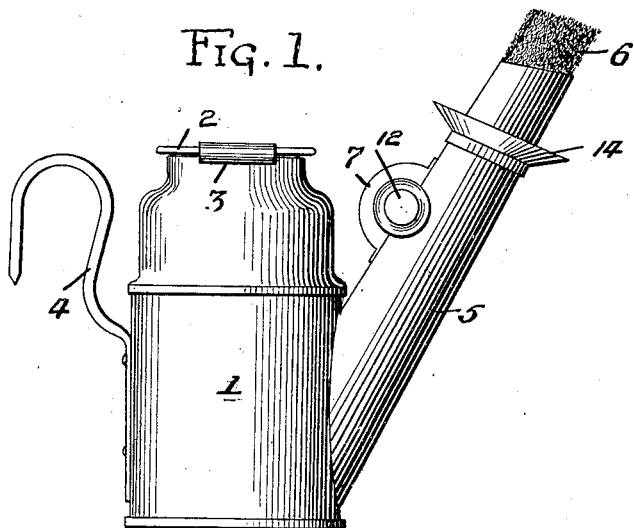
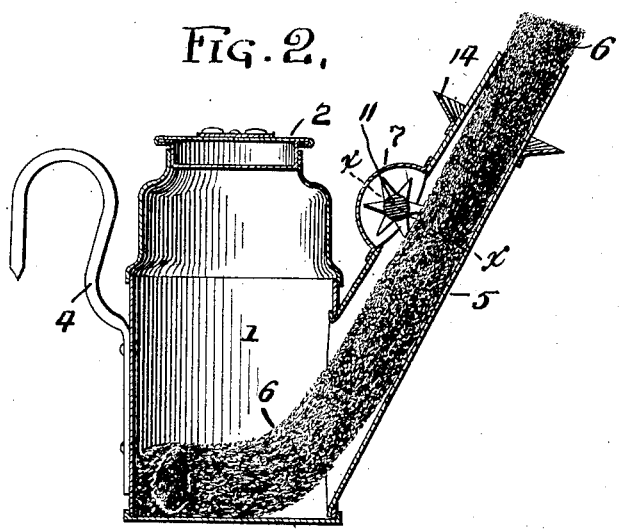
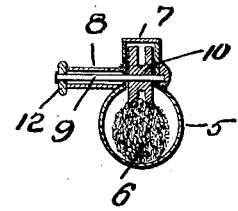
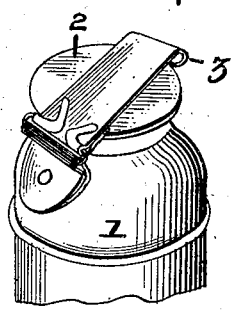
Witnesses:
Jesse C. Miller
Inventor:
Rudolf Zicha,
by Attorneys.

UNITED STATES PATENT OFFICE.

RUDOLF ZICHA, OF CLEVELAND, OHIO.

MINER'S LAMP.

No. 829,824.　　　　Specification of Letters Patent.　　　　Patented Aug. 28, 1906.

Application filed April 2, 1906. Serial No. 309,573.

*To all whom it may concern:*

Be it known that I, RUDOLF ZICHA, a citizen of the United States of America, residing at Cleveland, in the county of Cuyahoga and State of Ohio, have invented certain new and useful Improvements in Miners' Lamps, of which the following is a specification, reference being had therein to the accompanying drawings.

This invention relates to certain new and useful improvements in miners' lamps; and the invention has for its primary object the provision of novel means for adjusting the wick of a lamp.

Another object of this invention is to provide a miner's lamp that will be extremely simple in construction, strong and durable, comparatively inexpensive to manufacture, and highly efficient for the purposes for which it is used.

Briefly described, my improved lamp consists of a receptacle having a hinged lid and a hook by which it is secured to a miner's cap. The receptacle is provided with an angularly-disposed spout or wick casing having a revoluble star-wheel mounted therein adapted to engage the wick which passes through the spout or casing.

The above construction, together with the details entering into my invention, will be hereinafter more fully described and claimed, and, referring to the drawings accompanying this application, like numerals of reference designate corresponding parts throughout the several views, in which—

Figure 1 is a side elevation of a lamp constructed in accordance with my invention. Fig. 2 is a vertical sectional view of the same. Fig. 3 is a cross-sectional view taken on the line *x x* of Fig. 2, and Fig. 4 is a fragmentary perspective view of the lamp.

To put my invention into practice, I construct my improved lamp of a metallic cylindrical receptacle 1, adapted to contain oil or similar illuminating fuel. The top of the receptacle is provided with a hinged lid 2, normally held in a closed position by a spring-clip 3. The one side of the receptacle 1 is provided with a hook-shaped member 4 of a conventional form, by which the lamp is connected to a miner's cap or hat. (Not shown.) The opposite side of the receptacle is provided with an upwardly-extending tapering spout or casing 5, said spout being disposed at an angle to said receptacle and extending a slight distance thereabove. In the spout or casing 5 is mounted a cylindrical wick 6, of a fibrous material, which is adapted to absorb the oil or illuminating fuel within the receptacle, whereby when the upper end of said wick is ignited a brilliant light will be given off.

The spout or casing 5 near the receptacle 1 is provided with a semicylindrical casing 7, carrying a right-angular tubular extension 8. In the semicylindrical casing 7 and the extension 8 is journaled a pin 9, carrying upon its one end a double star-wheel 10, consisting of a plurality of points 11, adapted to engage in the wick 6. The opposite end of the pin 9 is provided with a conventional button or handle 12 by which the pin is rotated.

The upper end of the spout or casing 5 is provided with an annular deflector-plate 14, said plate being employed to protect the lower portion of the spout or casing 5 and the receptacle 1 from the heat of the ignited wick 6, also preventing oil that may ooze from said wick from flowing down the spout or casing 5 becoming ignited and causing the lamp to explode.

My invention entirely resides in the wick adjustment accomplished through the medium of the star or pointed wheel 11, and while I have herein described the preferred embodiments of my invention it is obvious that such changes as are permissible by the appended claim may be resorted to without departing from the spirit and scope of the invention.

What I claim, and desire to secure by Letters Patent, is—

A miner's lamp, comprising an oil-receptacle having a wick-spout, a semicylindrical casing carried by the wick-spout adjacent the oil-receptacle, a right-angularly-extending tubular casing projecting from the semicircular casing, a shaft journaled in said tubular casing and semicylindrical casing, a wick-engaging wheel on said shaft and a knob on the outer end of the shaft for operating the same.

In testimony whereof I affix my signature in the presence of two witnesses.

RUDOLF ZICHA.

Witnesses:
　FRANK ZICHA,
　FRANK REMESOKY.